(12) United States Patent
Liu et al.

(10) Patent No.: US 11,950,277 B2
(45) Date of Patent: *Apr. 2, 2024

(54) RESOURCE CONFIGURATION METHOD AND ACCESS NETWORK DEVICE

(71) Applicant: GUANGDONG OPPO MOBILE TELECOMMUNICATIONS CORP., LTD., Guangdong (CN)

(72) Inventors: Jianhua Liu, Guangdong (CN); Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 29 days.

This patent is subject to a terminal disclaimer.

(21) Appl. No.: 17/663,636

(22) Filed: May 16, 2022

(65) Prior Publication Data

US 2022/0279540 A1    Sep. 1, 2022

Related U.S. Application Data

(63) Continuation of application No. 17/394,997, filed on Aug. 5, 2021, now Pat. No. 11,375,523, which is a continuation of application No. PCT/CN2019/106361, filed on Sep. 18, 2019.

(51) Int. Cl.
*H04W 72/566* (2023.01)
*H04L 1/00* (2006.01)
*H04W 72/23* (2023.01)

(52) U.S. Cl.
CPC ......... *H04W 72/569* (2023.01); *H04W 72/23* (2023.01); *H04L 1/0003* (2013.01)

(58) Field of Classification Search
CPC .... H04W 72/569; H04W 72/23; H04L 1/0003
USPC .......................................................... 370/224
See application file for complete search history.

(56) References Cited

U.S. PATENT DOCUMENTS 11,375,523 B2 *   6/2022   Liu ..................... H04W 72/569

FOREIGN PATENT DOCUMENTS

| CN | 102076103 A | 5/2011 |
|----|-------------|--------|
| CN | 107155218 A | 9/2017 |
| CN | 108605329 A | 9/2018 |
| CN | 109314988 A | 2/2019 |
| CN | 110099093 A | 8/2019 |
| CN | 110213007 A | 9/2019 |

(Continued)

OTHER PUBLICATIONS

Chinese Application No. 202110817984.2, Decision to Grant dated Dec. 27, 2022, pp. 1-4.

(Continued)

*Primary Examiner* — Peter G Solinsky
(74) *Attorney, Agent, or Firm* — Perkins Coie LLP

(57) ABSTRACT

An implementation of the present disclosure relates to a resource configuration method and an access network device, wherein the method comprises: the access network device receives a plurality of time-sensitive communication assistance information (TSCAI) sent by a core network device, the plurality of TSCAI correspond to traffic attributes of a plurality of traffic flows; and the access network device configures semi-continuous scheduling resources for each traffic flow in the plurality of traffic flows according to the plurality of TSCAI.

20 Claims, 4 Drawing Sheets

(56) References Cited

FOREIGN PATENT DOCUMENTS

| EP | 3185615 | A1 | 6/2017 |
|---|---|---|---|
| GB | 2589865 | A | 6/2021 |
| WO | 2018200038 | A1 | 11/2018 |
| WO | 2019028768 | A1 | 2/2019 |
| WO | 2020200432 | A1 | 10/2020 |
| WO | 2020221436 | A1 | 11/2020 |
| WO | 2020239231 | A1 | 12/2020 |
| WO | 2020259793 | A1 | 12/2020 |
| WO | 2021028613 | A1 | 2/2021 |

OTHER PUBLICATIONS

Intel Corporation, On enhancements to DL SPS and discussion on incoming LS in R1-1905940,3GPP TSG RAN WG1 RAN1#97 Reno, USA, May 13-May 17, 2019, R1-1906812. 4 pages.
Oppo, Scheduling enhancements for TSC network, 3GPP TSG-RAN WG2 #106 Reno, US, May 13-May 17, 2019, R2-1906045. 5 pages.
Nokia, LS to SA2 on remaining TSCAI aspects, 3GPP TSG-RAN WG2 Meeting #107 Prague,Czech Republic, Aug. 26-30, 2019, R2-1909487. 2 pages.
JP Office Action dated Apr. 4, 2023 in JP App. 2021-576719 with English translation, 8 pages.
CATT "Burst Arrival time in TSC Assistance Information" S2-1907658; 3GPP TSG-SA WG2 Meeting #134; Sapporo, Japan, Jun. 24-28, 2019. 3 pages.
Ericsson "On message arrival time for TSN traffic" R2-1906843; 3GPP TSG-RAN WG2 #106; Reno, USA; May 13-17, 2019. 5 pages.
Extended European Search Report for European Application No. 19946202.9 dated Jul. 22, 2022. 7 pages.
First Office Action for Chinese Application No. 202110817984.2 dated Sep. 15, 2022. 16 pages with English translation.
Nokia et al. "Clarifications on TSC Assistance Information" R2-1909486; 3GPP TSG RAN WG2 Meeting #107; Prague, Czech Republic; Aug. 26-30, 2019. 4 pages.
Nokia et al. "Discussion—TSCAI Granularity and Reference Time used for TSCAI" S2-1905588; SA WG2 Meeting #133; May 13-17, 2019. Reno, NV, USA. 5 pages.
3GPP TS 23.501 V16.1.0 (Jun. 2019)—3rd Generation Partnership Project; Technical Specification Group Services and System Aspects; System Architecture for the 5G System; Stage 2 (Release 16) (368 pages).
3GPP TS 38.331 V15.0.0 (Dec. 2017)—3rd Generation Partnership Project; Technical Specification Group Radio Access Network NR Radio Resource Control (RRC) protocol specification (Release 15) (187 pages).
3GPP TSG-RAN WG2 Meeting #106—R2-1907194—Reno, USA, May 13-17, 2019—Nokia, Nokia Shanghai Bell, Clarifications on TSC Assistance Information to SA2 (3 pages).
Examination Report for Indian Application No. 202117039974 dated Apr. 22, 2022. 5 pages with English translation.
International Search Report dated Jun. 18, 2020 of PCT/CN2019/106361 (4 pages).
Non-Final Office Action dated Oct. 22, 2021 of U.S. Appl. No. 17/394,997, filed Aug. 5, 2021.
Notice of Allowance dated Feb. 16, 2022 of U.S. Appl. No. 17/394,997, filed Aug. 5, 2021.

* cited by examiner

RESOURCE CONFIGURATION METHOD AND ACCESS NETWORK DEVICE

CROSS-REFERENCE TO RELATED APPLICATION

This application is a continuation application of U.S. application Ser. No. 17/394,997 filed on Aug. 5, 2021, which is a continuation application of International PCT Application No. PCT/CN2019/106361 filed on Sep. 18, 2019, the entire content of both are hereby incorporated by reference.

TECHNICAL FIELD

The present disclosure relates to the field of communication, in particular to a method for configuring resources and an access network device.

BACKGROUND

At present, a New Radio (NR) system needs to support application scenarios such as Factory Automation, Transport Industry and Electrical Power Distribution. Based on the transmission requirements for time delay and reliability of the NR system, a concept of Time Sensitive Network (TSN) is introduced into the NR system.

In a TSN network, how to configure the resources for data transmission reasonably to ensure the requirement for delay of data transmission is an urgent problem to be solved.

SUMMARY

The implementation of the present disclosure provides a method for configuring resources and an access network device.

In a first aspect, there is provided a method for configuring resources, which includes: receiving, by an access network device, multiple time sensitive communication assistance information (TSCAI) sent by a core network device, wherein the multiple TSCAI correspond to service attributes of multiple service flows; and configuring, by the access network device, semi-persistent scheduling resources for each of the multiple service flows according to the multiple TSCAI.

In a second aspect, there is provided an access network device, configured to perform the method in the above first aspect or in various implementation modes thereof.

Specifically, the access network device includes function modules configured to execute the method in the above first aspect or in various implementations thereof.

In a third aspect, there is provided an access network device, which includes a processor and a memory. The memory is configured to store a computer program, and the processor is configured to call and run the computer program stored in the memory to execute the method in the above first aspect or in various implementations thereof.

In a fourth aspect, there is provided an apparatus, configured to implement the method in any one of the above first aspect or in various implementation modes thereof.

Specifically, the apparatus includes a processor configured to call and run a computer program from a memory to cause a device with the apparatus installed to perform the method in any one of the above first aspect or in various implementation modes thereof.

Optionally, the apparatus may be a chip.

In a fifth aspect, there is provided a computer readable storage medium, configured to store a computer program, wherein the computer program causes a computer to perform the method in any one of the above first aspect or in various implementation modes thereof.

In a sixth aspect, there is provided a computer program product, including computer program instructions, wherein the computer program instructions cause a computer to perform the method in any one of the above first aspect or in various implementation modes thereof.

In a seventh aspect, there is provided a computer program, which, when running on a computer, causes the computer to perform the method in any one of the above first aspect or various implementation modes thereof.

DETAILED DESCRIPTION

Technical solutions in implementations of the present disclosure will be described below with reference to the drawings in the implementations of the present disclosure. It is apparent that the implementations described are just some of the implementations of the present disclosure, but not all of the implementations of the present disclosure. Based on the implementations of the present disclosure, all other implementations achieved by a person of ordinary skill in the art without paying inventive efforts are within the protection scope of the present disclosure.

Implementations of the present disclosure may be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an NR system evolution system, a LTE-based access to unlicensed spectrum (LTE-U) system, an NR-based access to unlicensed spectrum (NR-U) system, a Universal Mobile Telecommunications System (UMTS), a Wireless Local Area Network (WLAN), Wireless Fidelity (WiFi), a next generation communication system, or other communication systems.

Generally speaking, the number of connections supported by a traditional communication system is limited and easy to implement. However, with development of the communication technology, mobile communication systems will not only support traditional communication, but also support, for example, Device to Device (D2D) communication, Machine to Machine (M2M) communication, Machine Type Communication (MTC), or Vehicle to Vehicle (V2V) communication. The implementations of the present disclosure may also be applied to these communication systems.

Optionally, the communication system in the implementations of the present disclosure may be applied to a Carrier Aggregation (CA) scenario, a Dual Connectivity (DC) scenario, or a Standalone (SA) scenario.

Figure 1:
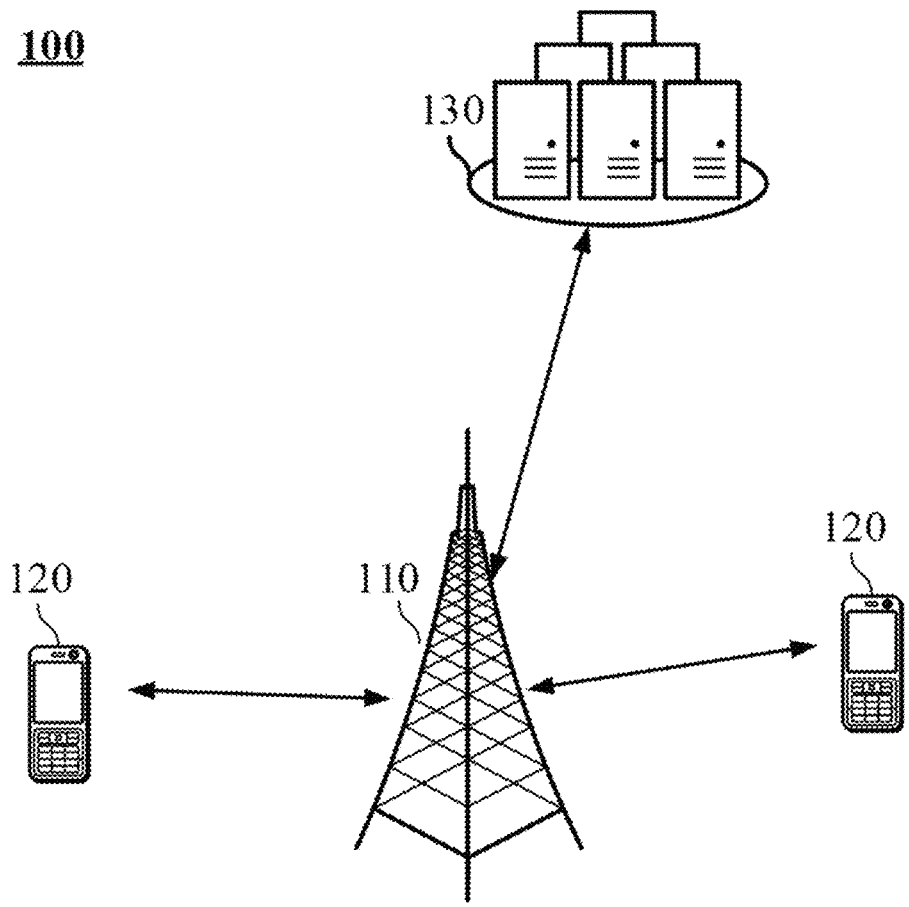
FIG. 1 is a schematic diagram of architecture of a communication system according to an implementation of the present disclosure.

FIG. 1 shows a wireless communication system 100 to which an implementation of the present disclosure is applied. The wireless communication system 100 may include an access network device 110. The access network device 110 may be a device that communicates with a terminal device. The access network device 110 may provide communication coverage for a specific geographical area, and may communicate with a terminal device located within the coverage area. Optionally, the network device 110 may be a Next Generation Radio Access Network (NG RAN), a base station (gNB) in or an NR system, or a radio controller in a Cloud Radio Access Network (CRAN), or the access network device may be mobile switching center, a relay station, an access point, an on-board device, a wearable device, a hub, a switch, a bridge, a router, or a network device in a future evolved Public Land Mobile Network (PLMN), etc. Optionally, the access network device 110 may also be a base station in an LTE system, for example, an E-UTRAN device.

The wireless communication system 100 also includes at least one terminal device 120 located within the coverage area of the access network device 110. The terminal device 120 may be mobile or fixed. The "terminal device" as used herein includes, but not limited to, a device configured to be connected via a wired circuit, for example, via a public switched telephone network (PSTN), a digital subscriber line (DSL), a digital cable, a direct cable; and/or another data connection/network; and/or via a wireless interface, for instance, for a cellular network, a wireless local area network (WLAN), a digital television network such as a DVB-H network, a satellite network, and an AM-FM broadcast transmitter; and/or an apparatus of another terminal device configured to receive/transmit communication signals; and/or an Internet of Things (IoT) device. A terminal device configured to communicate via a wireless interface may be referred to as "a wireless communication terminal", "a wireless terminal" or "a mobile terminal". Examples of the mobile terminal include, but not limited to, a satellite or cellular phone; a personal communication system (PCS) terminal capable of combining a cellular radio phone with data processing, faxing, and data communication capabilities; a personal digital assistant (PDA) that may include a radio phone, a pager, internet/intranet access, a Web browser, a memo pad, a calendar, a BeiDou Navigation Satellite System (BDS), a Global Positioning System (GPS) receiver; and a conventional laptop and/or palmtop receiver or other electronic devices including a radio phone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), etc.

The wireless communication system 100 further includes a core network device 130 that communicates with the access network device. Optionally, the core network device 130 may be a 5G core network device, for example, an Access and Mobility Management Function (AMF) device, which is responsible for access and mobility management, and has functions such as authentication, handover and location update for users. As another example, the core network device 130 may be a Session Management Function (SMF) device, which is responsible for session management, including establishment, modification and release of packet data unit (PDU) sessions. As another example, the core network device 130 may be a user plane function (UPF) device, which is responsible for forwarding of user data.

Optionally, a device to device (D2D) communication may be performed between the terminal devices.

FIG. 1 illustratively shows one access network device, one core network device and two terminal devices. Optionally, the wireless communication system 100 may include multiple access network devices, and another quantity of terminal devices may be included within the coverage area of each access network device, which is not restricted in implementations of the present disclosure.

It should be understood that the terms "system" and "network" are often used interchangeably in this document.

Figure 2:
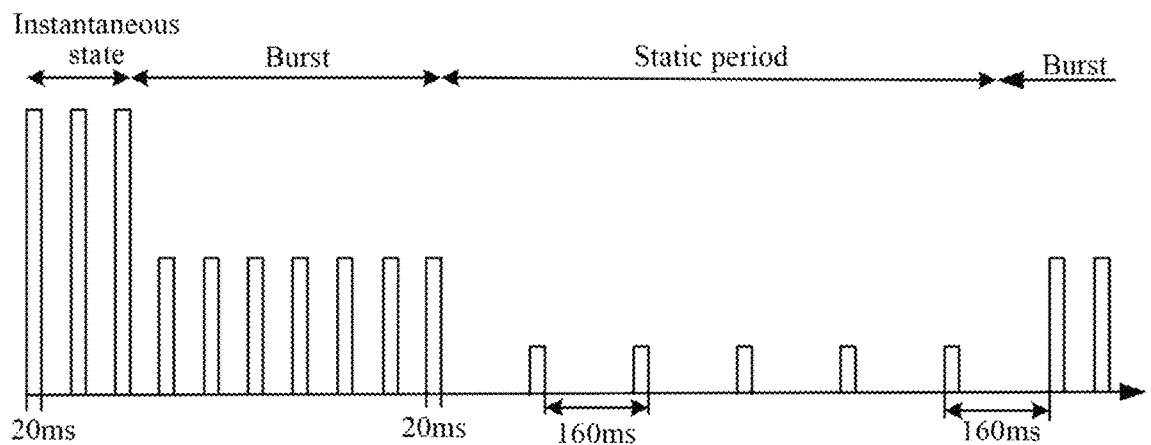
FIG. 2 is a schematic diagram of periodical configuration of semi-static resources.

In a TSN network, the requirement for delay of data transmission is strict, and the delay of data transmission is required to be within an expected range. To achieve this purpose, the access network device may configure Semi-Persistent Scheduling (SPS) resources according to the service attributes of TSN data. The service attributes may be arrival time of data, data period and data size. In this way, when the data arrives, the terminal device may directly use SPS resources for data transmission, thus meeting the requirement for delay of data transmission. A specific implementation way in which the access network device configures SPS resources is: SMF determines Time Sensitive Communication Assistance Information (TSCAI) according to service information provided by an external Application Function (AF). Then, SMF provides TSCAI to a Radio Access Network (RAN). After receiving TSCAI, RAN may configure SPS resources according to TSCAI. SPS resources are periodic, as shown in FIG. 2. The period of SPS resources configured by RAN is 20 ms or 160 ms.

Figure 3:
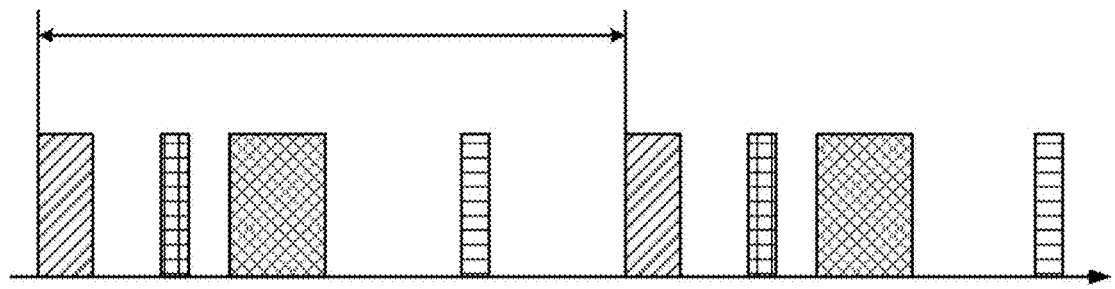
FIG. 3 is a schematic diagram of semi-static configuration of resources according to QoS flows.

At present, the access network device may configure SPS resources according to Quality of Service (QoS) flows, and each QoS flow may carry multiple service flows. Referring to FIG. 3, different patterns represent different service flows. It can be seen that the QoS flow in FIG. 3 carries 4 service flows, wherein the 4 service flows have the same period. When configuring the SPS resources, the resources configured by the access network device need to cover all service flows, so it will happen that the access network device configures the SPS resources within a time period without service (such as the blank area between the first service flow and the second service flow in FIG. 3), resulting in the problem of resource waste.

In view of this, the implementation of the present disclosure proposes a method for configuring resources, which may reasonably configure resources for data transmission while ensuring the requirement for delay of data transmission.

Figure 4:
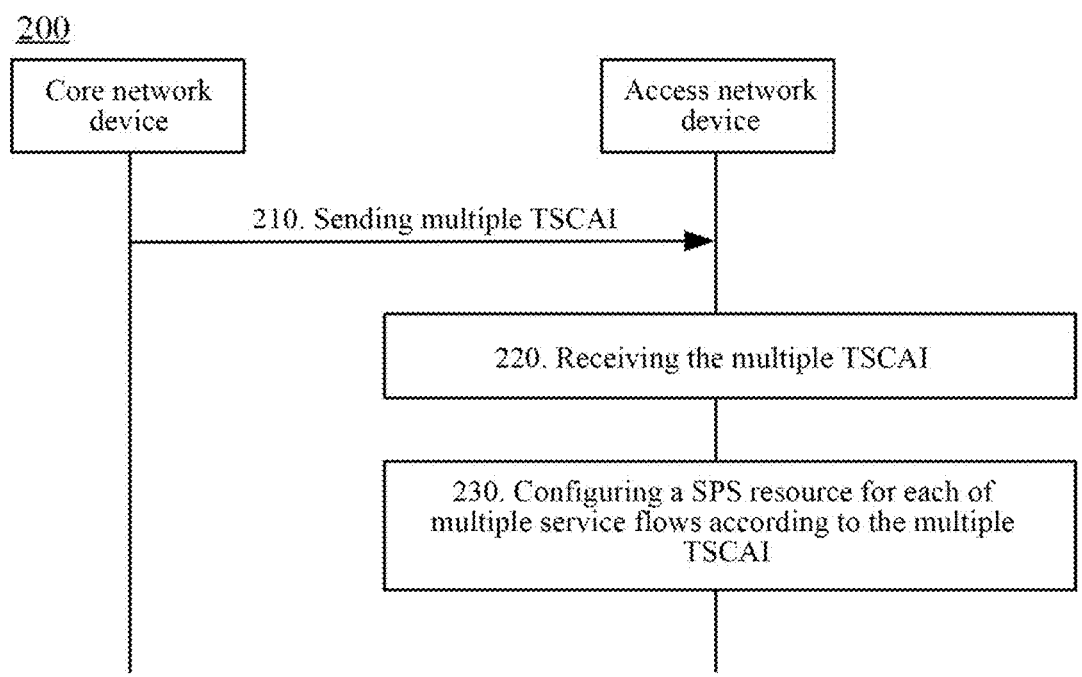
FIG. 4 is a schematic flowchart of a method for configuring resources according to an implementation of the present disclosure.

FIG. 4 is a schematic flow chart of a method 200 for configuring resources according to an implementation of the present disclosure. The method described in FIG. 4 may be performed by an access network device such as the access network device 110 shown in FIG. 1 and a core network device such as 130 shown in FIG. 1. As shown in FIG. 4, the method 200 may include at least part of following contents.

It should be understood that in the implementation of the present disclosure, the method 200 may be applied to other communication scenarios besides TSN network, which is not specifically limited by the implementation of the present disclosure.

In 210, a core network device sends TSCAI to an access network device, wherein the multiple TSCAI correspond to service attributes of multiple service flows.

In 220, the access network device receives multiple TSCAI sent by the core network.

In 230, the access network device configures SPS resources for each of the multiple service flows according to multiple TSCAI.

The service attributes may include but are not limited to at least one of the following: arrival time of data, data period and data size.

Optionally, the data size may be historical data size. Illustratively, the historical data size may be a historical average data size within a period of time. Also illustratively, the historical data size may be an average of a highest data size and a lowest data size within a period of time.

Or, the data size may be an estimated data size.

In addition, the service attribute may also include an upstream and downstream data flow direction.

Optionally, one TSCAI may be aimed at one service flow or multiple service flows. In case that the TSCAI is aimed at multiple service flows, TSCAI of the multiple service flows is same.

Optionally, at least one of arrival time of data, data period, upstream/downstream data flow direction and data size of the service flow is different among different TSCAI.

Before the core network device sends multiple TSCAI to the access network device, the core network device may generate TSCAI in advance. The core network device is SMF.

As an example, AF may provide auxiliary parameters for each service flow to SMF, and SMF may generate multiple TSCAI according to the auxiliary parameters of each service flow after receiving the auxiliary parameters of each service flow.

The auxiliary parameters may include arrival time of data, data period and data size of data, or the auxiliary parameters may include indication parameters indicating arrival time of data, data period or data size.

As another example, the terminal device may provide auxiliary parameters of each service flow to SMF through a Non-Access Stratum (NAS) message. After receiving the auxiliary parameters of each service flow, SMF may generate multiple TSCAI according to the auxiliary parameters of each service flow.

In an implementation of the present disclosure, SMF may map multiple service flows into same or different QoS flows and provide them to the access network device to assist the access network device in configuring SPS resources for multiple service flows. The technical solutions of the implementations of the present disclosure are introduced in two ways.

Mode 1

When a QoS flow is established, SMF may configure multiple TSCAI for each QoS flow, that is, multiple TSCAI may correspond to the same one QoS flow.

After the access network device receives multiple TSCAI, the access network device may configure multiple SPS resources to match different TSCAI values.

In one implementation, the access network device may configure discrete resources within one period of SPS resources. Specifically, the access network device may determine start time of each discrete resource according to arrival time of data of each service flow corresponding to each TSCAI, that is, the access network device may determine start time of SPS resources for each service flow according to arrival time of data of each service flow.

In addition, the access network device may determine a frequency domain resource of each discrete resource and/or a Modulation and Coding Scheme (MCS) corresponding to the discrete resource according to the data size of each service flow corresponding to each TSCAI.

With regard to the period of discrete resources, as an example, the access network device may periodically configure SPS resources for each service flow based on the data period of each service flow corresponding to each TSCAI.

As another example, if the data periods of at least two of multiple service flows are different, a period of each discrete resource may be a smallest data period among the data periods of multiple service flows.

In another implementation, the access network device may configure multiple sets of SPS resources, wherein each set of SPS resources may be configured according to different TSCAI.

Further, the method 200 may further include: determining, by the access network device, a resource size of a SPS resource of a first QoS flow according to a Maximum Data Burst Volume (MDBV) of a QoS flow corresponding to multiple TSCAI (for convenience of description, referred to as a first QoS flow). For example, the access network device may determine a bandwidth of the SPS resource of the first QoS flow, a MCS level corresponding to the SPS resource of the first QoS flow, and the like according to MDBV of the first QoS flow.

The core network device may determine MDBV of the first QoS flow before the access network device determines the resource size of the SPS resource of the first QoS flow. The core network device may send MDBV of the first QoS flow to the access network device after determining MDBV of the first QoS flow.

Optionally, the core network device may explicitly send MDBV of the first QoS flow to the access network device.

Optionally, the core network device may implicitly send MDBV of the first QoS flow to the access network device. Illustratively, the core network device may implicitly send MDBV of the first QoS flow to the access network device through other parameters of the first QoS flow.

If MDBV of the first QoS flow is an aggregation value of multiple service flows, a size of the SPS resource of the first QoS flow may be the aggregation value.

If MDBV of the first QoS flow is a data size of each service flow, a size of the SPS resource of the first QoS flow may be a maximum of the data size of each service flow, or the size of the SPS resource of the first QoS flow may be an average value of the data size of each service flow.

Mode 2

After SMF receives auxiliary information of the service flow from AF or a terminal device, SMF may generate multiple QoS flows, wherein the multiple QoS flows correspond to different TSCAI. For example, there are 3 service flows. If TSCAI of the 3 service flows are different, SMF may generate 3 QoS flows. If TSCAI of 2 of the 3 service flows is same, SMF may generate 2 QoS flows.

The access network device may configure SPS resources for each service flow according to TSCAI corresponding to each QoS flow after receiving the QoS flow and TSCAI corresponding to the QoS flow.

It should be understood that in Mode 2, the implementation mode of the access network device configuring SPS resources for each service flow may refer to the implementation mode of Mode 1, and for the sake of brevity, it will not be described here too much.

Further, the access network device may determine the resource size of the SPS resource of each QoS flow according to TSCAI corresponding to each QoS flow in multiple QoS flows.

To describe the method, a second QoS flow, which corresponds to a second TSCAI, will be taken as an example for explanation. The second QoS flow belongs to multiple QoS flows above, and the second TSCAI belongs to multiple TSCAI above.

If the second TSCAI corresponds to service attributes of one service flow, a resource size of the SPS resource of the second QoS flow equals a data size of the service flow.

If the second TSCAI corresponds to service attributes of at least two service flows and MDBV of the second QoS flow is an aggregation value of the at least two service flows, the resource size of the SPS resource of the second QoS flow is the aggregation value. If MDBV of the second QoS flow is the data size of each of the at least two service flows, the resource size of the SPS resource of the second QoS flow is the data size of one of the at least two service flows.

It should be understood that various implementations of the implementations of the present disclosure may be implemented separately or in combination, which is not limited by the implementations of the present disclosure. For example, Mode 1 and Mode 2 in the implementation of the present disclosure may be implemented separately or in combination. When mode 1 and mode 2 are implemented in combination, part of TSCAI among multiple TSCAI may correspond to one QoS flow, and each TSCAI in a remaining part of TSCAI may correspond to one QoS flow. For example, the access network device receives TSCAI sent by the core network device, which are TSCAI 1, TSCAI 2 and TSCAI 3 respectively, and these three TSCAI are different form each other. TSCAI 1 and TSCAI 2 may correspond to a third QoS flow, and TSCAI 3 may correspond to a fourth QoS flow.

It should be understood that in the implementations of the present disclosure, "first", "second", "third" and "fourth" are only for distinguishing different objects, but do not construct limitation on the scope of the implementations of the present disclosure.

In this implementation of the present disclosure, when configuring the resource of each service flow, the access network device may configure the resource according to TSCAI corresponding to the service attribute of each service flow, so that the resources configured by the access network device may meet the requirements for data transmission of each service flow without causing waste of resources. In addition, the resource configured by the access network device for each service flow is semi-persistent scheduling resource, so that when data arrives, the configured semi-persistent scheduling resources may be directly used for data transmission, thereby ensuring the requirement for delay of data transmission.

The preferred implementations of the present disclosure have been described in detail above with reference to the attached drawings, but the present disclosure is not limited to the specific details of the above implementations. Within the technical conception scope of the present disclosure, various simple modifications may be made to the technical solution of the present disclosure, wherein these simple modifications all belong to the protection scope of the present disclosure.

For example, without contradiction, the specific technical features described in the above specific implementations may be combined in any suitable mode. In order to avoid unnecessary repetition, various possible combination modes are not explained separately in the present disclosure.

For another example, various different implementations of the present disclosure may be combined arbitrarily, and as long as they do not violate the idea of the present disclosure, they should also be regarded as the contents disclosed in the present disclosure.

It should be understood that sequence numbers of the foregoing processes do not mean execution sequences in various method implementations of the present disclosure. The execution sequences of the processes should be determined according to functions and internal logic of the processes, and should not be construed as any limitation on the implementation processes of the implementations of the present disclosure.

The communication methods according to implementations of the present disclosure have been described in detail above, and communication devices according to implementations of the present disclosure will be described below in combination with FIG. 5 and FIG. 6. The technical features described in the method implementations are applicable to the following device implementations.

Figure 5:
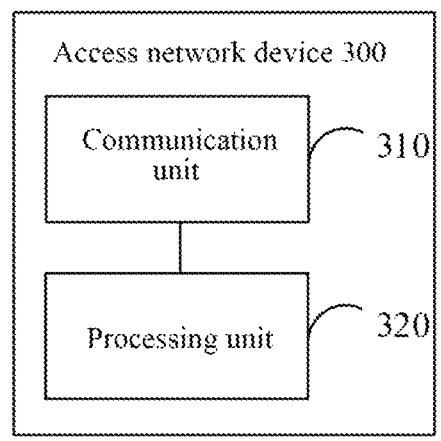
FIG. 5 is a schematic block diagram of an access network device according to an implementation of the present disclosure.

FIG. 5 shows a schematic block diagram of an access network device 300 according to an implementation of the present disclosure. As shown in FIG. 5, the access network device 300 includes:

a communication unit 310, configured to receive multiple time sensitive communication assistance information (TS-CAI) sent by a core network device, wherein the multiple TSCAI correspond to service attributes of multiple service flows; and a processing unit 320, configured to configure semi-persistent scheduling resources for each of the multiple service flows according to the multiple TSCAI.

Optionally, in the implementation of the present disclosure, the service attribute includes at least one of arrival time of data, data period and data size.

Optionally, in the implementation of the present disclosure, the processing unit 320 is specifically configured to determine start time of semi-persistent scheduling resources for each service flow according to arrival time of data of each service flow corresponding to each TSCAI.

Optionally, in the implementation of the present disclosure, the processing unit 320 is specifically configured to determine a frequency domain resource of the semi-persistent scheduling resource for each service flow and/or a modulation and coding scheme (MCS) corresponding to the semi-persistent scheduling resources for each service flow according to the data size of each service flow corresponding to each TSCAI.

Optionally, in the implementation of the present disclosure, the processing unit 320 is specifically configured to periodically configure semi-persistent scheduling resources for each service flow based on the data period of each service flow corresponding to each TSCAI.

Optionally, in the implementation of the present disclosure, if the data periods of at least two of the multiple service flows are different, the period of the semi-persistent scheduling resource of each service flow is a smallest data period among the data periods of the multiple service flows.

Optionally, in the implementation of the present disclosure, the service attribute further includes data flow direction.

Optionally, in the implementation of the present disclosure, the multiple TSCAI correspond to one Quality of Service QoS flow.

Optionally, in the implementation of the present disclosure, the processing unit 320 is further configured to determine the size of the semi-persistent scheduling resource of the QoS flow according to a maximum data burst volume (MDBV) of the QoS flow.

Optionally, in the implementation of the present disclosure, the communication unit 310 is further configured to receive MDBV of the QoS flow sent by the core network device.

Optionally, in the implementation of the present disclosure, if MDBV of the QoS flow is an aggregation value of the multiple service flows, the size of the semi-persistent scheduling resource of the QoS flow is the aggregation value.

Optionally, in the implementation of the present disclosure, if MDBV of the QoS flow is the data size of each service flow, the size of the semi-persistent scheduling resource of the QoS flow is a maximum of the data size of each service flow.

Optionally, in the implementation of the present disclosure, the multiple TSCAI correspond to different QoS flows.

Optionally, in the implementation of the present disclosure, TSCAI corresponding to different QoS flows is different.

It should be understood that the access network device 300 may correspond to the access network device 200, and may implement the corresponding operations of the access network device in the method 200, which will not be repeated here for brevity.

Figure 6:
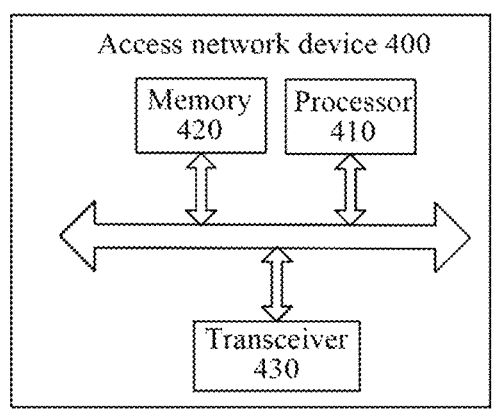
FIG. 6 is a schematic block diagram of an access network device according to an implementation of the present disclosure.

FIG. 6 is a schematic structural diagram of an access network device 400 provided by an implementation of the present disclosure. The access network device 400 shown in FIG. 6 includes a processor 410. The processor 410 may call and run a computer program from a memory to implement a method in the implementation of the present disclosure.

Optionally, as shown in FIG. 6, the access network device 400 may further include the memory 420. The processor 410 may call and run the computer program from the memory 420 to implement the methods according to the implementations of the present disclosure.

The memory 420 may be a separate device independent of the processor 410 or may be integrated in the processor 410.

Optionally, as shown in FIG. 6, the access network device 400 may further include a transceiver 430, and the processor 410 may control the transceiver 430 to communicate with other devices. Specifically, the transceiver 630 may send information or data to other devices or receive information or data sent by other devices.

The transceiver 430 may include a transmitter and a receiver. The transceiver 430 may further include antennas, the number of which may be one or more.

Optionally, the access network device 400 may be specifically an access network device of an implementation of the present disclosure, and the access network device 400 may implement corresponding flows implemented by the access network device in various methods of the implementations of the present disclosure, which will not be repeated here for brevity.

Figure 7:
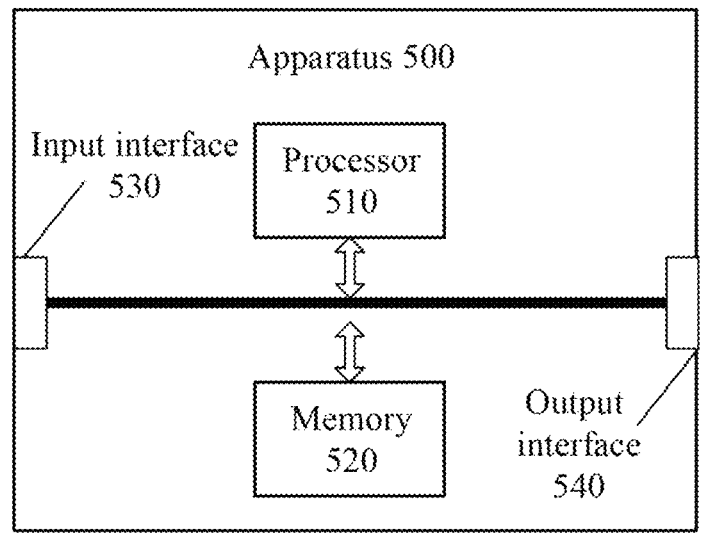
FIG. 7 is a schematic block diagram of a device according to an implementation of the present disclosure.

FIG. 7 is a schematic structural diagram of an apparatus of an implementation of the present disclosure. An apparatus 500 shown in FIG. 7 includes a processor 510. The processor 510 may call and run a computer program from a memory to implement the method in the implementation of the present disclosure.

Optionally, as shown in FIG. 7, the apparatus 500 may further include a memory 520. The processor 510 may call and run the computer program from the memory 520 to implement the methods according to the implementations of the present disclosure.

The memory 520 may be a separate device independent of the processor 510 or may be integrated in the processor 510.

Optionally, the apparatus 500 may further include an input interface 530. The processor 510 may control the input interface 530 to communicate with other devices or chips. Specifically, the processor 910 may acquire information or data sent by other devices or chips.

Optionally, the apparatus 500 may further include an output interface 540. The processor 510 may control the output interface 540 to communicate with other devices or chips. Specifically, the processor 910 may output information or data to other devices or chips.

Optionally, the apparatus may be applied in an access network device of an implementation of the present disclosure, and the apparatus may implement the corresponding processes implemented by the access network device in the various methods of implementations of the present disclosure, which will not be repeated here for brevity.

Optionally, the apparatus 500 may be a chip. It should be understood that the chip mentioned in the implementations of the present disclosure may be referred to as a system-level chip, a system chip, a chip system or a system-on-chip, etc.

It should be understood that the processor in the implementation of the present disclosure may be an integrated circuit chip having a signal processing capability. In an implementation process, the steps of the foregoing method implementations may be implemented through an integrated logic circuit of hardware in the processor or instructions in a form of software. The processor described above may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform various methods, steps and logical block diagrams disclosed in the implementations of the present disclosure. The general purpose processor may be a microprocessor, or the processor may also be any conventional processor, or the like. The steps of the methods disclosed in combination with the implementations of the present disclosure may be directly embodied to be implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but not restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but not be limited to, these and any other suitable types of memories.

It should be understood that the foregoing memory is described in an exemplary but non-limiting sense. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present disclosure is intended to include, but not be limited to, these and any other suitable types of memories.

Figure 8:
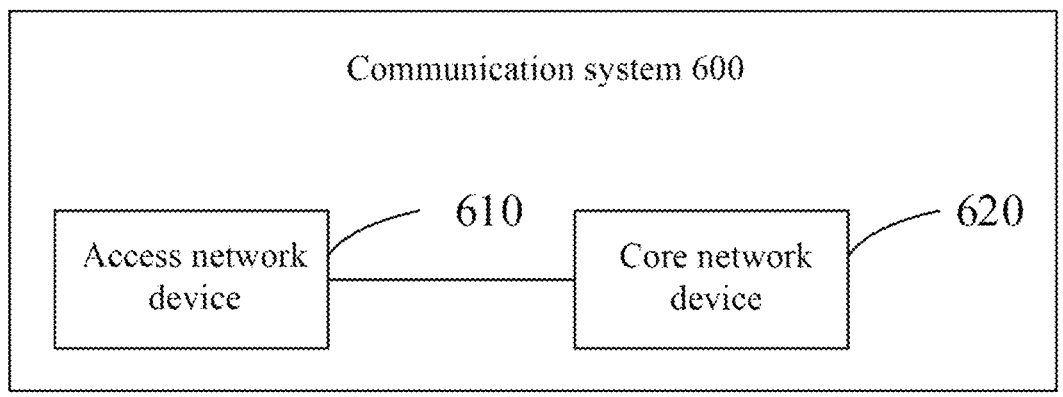
FIG. 8 is a schematic block diagram of a communication system according to an implementation of the present disclosure.

FIG. 8 is a schematic block diagram of a communication system 600 provided by an implementation of the present disclosure. As shown in FIG. 8, the communication system 600 may include an access network device 610 and a core network device 620.

Herein, the access network device 610 may be configured to implement the corresponding functions implemented by the access network device in the above-mentioned methods and the core network device 620 may be configured to implement the corresponding functions implemented by the core network device in the above-mentioned methods, which will not be repeated here for brevity.

An implementation of the present disclosure further provides a computer readable storage medium configured to store a computer program.

Optionally, the computer readable storage medium may be applied to an access network device of an implementation of the present disclosure, and the computer program causes a computer to perform corresponding flows implemented by the access network device in various methods of the implementations of the present disclosure, which will not be repeated here for brevity.

An implementation of the present disclosure further provides a computer program product including computer program instructions.

Optionally, the computer program product may be applied to an access network device of an implementation of the present disclosure, and the computer program instructions cause a computer to perform corresponding flows implemented by the access network device in various methods of the implementations of the present disclosure, which will not be repeated here for brevity.

An implementation of the present disclosure further provides a computer program.

Optionally, the computer program may be applied to an access network device of an implementation of the present disclosure. When being run on a computer, the computer program causes the computer to execute corresponding processes implemented by the access network device in various methods of the implementations of the present disclosure, which will not be repeated here for brevity.

A person of ordinary skill in the art may recognize that the elements and algorithm steps in various examples described in combination with the implementations disclosed herein may be implemented in electronic hardware, or a combination of computer software and electronic hardware. Whether these functions are implemented in hardware or software depends on the specific application and design constraints of the technical scheme. Skilled artisans may use various methods to implement the described functions for each particular application, but such implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method implementations and will not be repeated herein.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, devices or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

The function, if implemented in a form of software functional unit and sold or used as an independent product, may be stored in a computer readable storage medium. Based on such understanding, the technical scheme of the present disclosure, in essence, or the part contributing to the prior art, or the part of the technical solution, may be embodied in the form of a software product, which is stored in a storage medium, and includes several instructions for causing a computer device (which may be a personal computer, a server, or a network device, etc.) to perform all or part of the steps of various implementations of the present disclosure. The aforementioned storage medium includes various media, such as a U disk, a mobile hard disk, a read-only memory (ROM), a random access memory (RAM), a magnetic disk, or an optical disk, which are capable of storing program codes.

What we claim is:

1. A method for configuring resources, wherein the method comprises:
   receiving, by a network device, a plurality of time sensitive communication assistance information (TSCAI), wherein the plurality of TSCAI correspond to service attributes of a plurality of service flows; and
   configuring, by the network device, a semi-persistent scheduling resource for each of the plurality of service flows according to the plurality of TSCAI.

2. The method according to claim 1, wherein the service attributes comprise at least one of arrival time of data or data period.

3. The method according to claim 2, wherein configuring, by the network device, the semi-persistent scheduling resource for each of the plurality of service flows according to the plurality of TSCAI comprises:
   determining, by the network device, start time of the semi-persistent scheduling resource for each service flow according to the arrival time of data of each service flow corresponding to each TSCAI.

4. The method according to claim 2, wherein configuring, by the network device, the semi-persistent scheduling resource for each of the plurality of service flows according to the plurality of TSCAI comprises:
   determining, by the network device, a frequency domain resource of the semi-persistent scheduling resource for each service flow and/or a modulation and coding scheme (MCS) corresponding to the semi-persistent scheduling resource for each service flow according to the data size of each service flow corresponding to each TSCAI.

5. The method according to claim 2, wherein configuring, by the network device, the semi-persistent scheduling resource for each of the plurality of service flows according to the plurality of TSCAI comprises:
   configuring, by the network device, the semi-persistent scheduling resource for each service flow periodically based on the data period of each service flow corresponding to each TSCAI.

6. The method according to claim 1, wherein if data periods of at least two of the plurality of service flows are different, a period of the semi-persistent scheduling resource of each service flow is a smallest data period among the data periods of the plurality of service flows.

7. The method according to claim 2, wherein the service attributes further comprise data stream direction.

8. The method according to claim 1, wherein the plurality of TSCAI correspond to different QoS flows, TSCAIs corresponding to different QoS flows are different.

9. The method according to claim 8, wherein TSCAI corresponding to different QoS flows is different.

10. A network device, comprising: a processor, a memory and a transceiver, wherein the memory is configured to store a computer program, the transceiver is configured to communicate with other devices under control of the processor, and the processor is configured to call and run the computer program stored in the memory to:
    receive, through the transceiver, a plurality of time sensitive communication assistance information (TSCAI), wherein the plurality of TSCAI correspond to service attributes of a plurality of service flows; and
    configure a semi-persistent scheduling resource for each service flow in the plurality of service flows according to the plurality of TSCAI.

11. The network device according to claim 10, wherein the service attributes comprise at least one of arrival time of data, data period and data size.

12. The network device according to claim 11, wherein the processor is specifically configured to:
    determine start time of the semi-continuous scheduling resource for each service flow according to the arrival time of data of each service flow corresponding to each TSCAI.

13. The network device according to claim 11, wherein the processor is specifically configured to:
    determine a frequency domain resource of the semi-persistent scheduling resource for each service flow and/or a modulation and coding scheme (MCS) corresponding to the semi-persistent scheduling resource for each service flow according to the data size of each service flow corresponding to each TSCAI.

14. The network device according to claim 11, wherein the processor is specifically configured to:
    configure the semi-persistent scheduling resource for each service flow periodically based on the data period of each service flow corresponding to each TSCAI.

15. The network device according to claim 10, wherein if data periods of at least two of the plurality of service flows are different, a period of the semi-persistent scheduling resource of each service flow is a smallest data period among the data periods of the plurality of service flows.

16. The network device according to claim 11, wherein the service attributes further comprise data stream direction.

17. The network device according to claim 10, wherein the plurality of TSCAI correspond to one QoS flow.

18. The network device according to claim 10, wherein the plurality of TSCAI correspond to different QoS flows.

19. The network device according to claim 18, wherein TSCAI corresponding to different QoS flows is different.

20. A core network device, comprising: a processor, a memory and a transceiver, wherein the memory is configured to store a computer program, the transceiver is configured to communicate with other devices under control of the processor, and the processor is configured to call and run the computer program stored in the memory to:
    send a plurality of time sensitive communication assistance information (TSCAI), wherein the plurality of TSCAI correspond to service attributes of a plurality of service flows and are used for configuring a semi-persistent scheduling resource for each of the plurality of service flows.

* * * * *